Patented Oct. 31, 1933

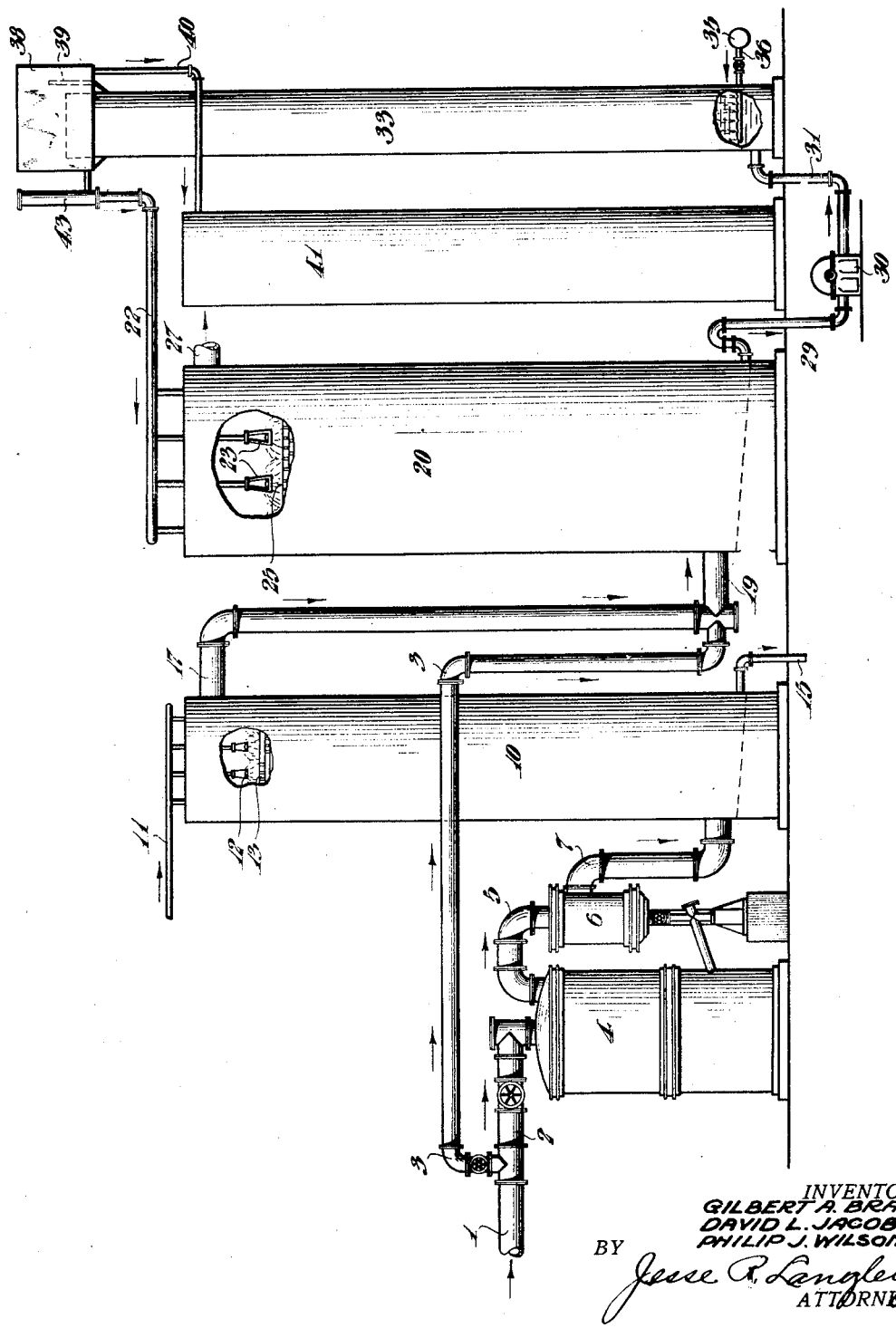

1,932,507

UNITED STATES PATENT OFFICE 1,932,507

GAS PURIFICATION

Gilbert A. Bragg and David L. Jacobson, Pittsburgh, and Philip J. Wilson, Jr., Edgeworth, Pa., assignors to The Koppers Company of Delaware, a corporation of Delaware Application December 16, 1930
Serial No. 502,668

4 Claims. (Cl. 23—3)

Our invention relates to the purification of gases and especially to the purification of fuel gases such as coal gas, coke oven gas, water gas, and the like from hydrogen sulphide and other impurities. Our invention relates especially to the purification of fuel gases from acidic impurities by means of liquids containing a catalyst or catalysts in solution and/or in suspension, such catalysts serving to facilitate the actification of, and the liberation of elemental sulphur from, the absorbing liquid which has been fouled by absorption of impurities from the gas.

The catalysts used in sulphur recovery liquid purification processes may be of several types, such as iron and its compounds, nickel and its compounds, and elements in the tin group of qualitative analysis, especially arsenic, antimony and tin and their compounds. Processes employing catalysts belonging to the tin group are described in U. S. Patents Nos. 1,719,177 and 1,719,762 to H. A. Gollmar and No. 1,719,180 to D. L. Jacobson. Our present process is advantageously practiced in combination with processes of this type but is not limited thereto.

In the processes of the latter type a solution containing a compound of an element of the tin group, preferably arsenic, is recirculated over a system comprising an absorption stage and an actification stage. In the absorption stage $H_2S$ and other acidic constituents of the gas, such as HCN, are absorbed by the solution which is thereby fouled. The fouled solution is then actified or regenerated by some suitable procedure, such as aeration, which liberates the sulphur removed from the gas in the absorption stage. The sulphur separates from the solution as a froth which is removed and the actified solution is recirculated to purify further quantities of gas.

The solution is kept in a neutral or slightly alkaline condition by periodic or continuous additions of a suitable alkaline material such as sodium carbonate, lime, magnesia, or the like, to the recirculatory system. These additions are made necessary by mechanical losses of solution and by the conversion of the alkali to fixed salts which are not decomposed during actification. The purification of the gas from $H_2S$, etc., is accomplished by the complex thioarsenic compound of an alkali or alkali earth metal contained in the solution, which must be neutral or alkaline.

In other processes for the liquid purification of gas, as when iron, nickel, etc., or their compounds are used as catalysts, analogous conditions obtain. In these processes, $H_2S$ is absorbed from the gas by an alkaline solution or suspension which is then aerated or otherwise actified to regenerate the solution and liberate sulphur, and the actified liquid is recirculated to treat further quantities of gas. Generally the solutions used in these processes are more efficient when kept at a higher alkalinity than is maintained when catalysts of the tin group, especially arsenic, are used, as in the process known in the art as the Thylox process, and described in the patents referred to hereinabove.

Our invention provides an improved method of maintaining the desired hydrogen ion concentration (pH) in solutions or suspensions used for the removal of $H_2S$ and analogous impurities from fuel gas, a result which is an object of the invention. Although our process is especially suitable for use in conjunction with the processes of purification employing thioarsenic compounds as described hereinabove, it is broadly adapted to use with any sulphur-recovery liquid purification process wherein $H_2S$ and the like are removed from gas by neutral or somewhat alkaline liquids.

Another object of our invention is to provide a process whereby the alkaline constituents of raw fuel gas, especially ammonia, are used to maintain the desired pH in solutions used for the purification of the gas from acidic impurities, and suitable apparatus therefor.

Our invention has for further objects such other operative advantages and results as are obtained in the process hereinafter described and claimed.

It is general practice to cool and partially condense crude fuel gas such as coke-oven gas, coal gas, etc., as first produced, to remove tar, water vapor, fixed ammonia, etc. When the removal of tar is substantially complete, the gas is passed through an ammonium sulphate saturator or an ammonia scrubber, or otherwise treated for removal of ammonia remaining therein. The gas is then cooled to substantially atmospheric temperature and treated for the removal of acidic impurities such as $H_2S$, HCN, etc. Light oils may be removed from the gas either before or after the removal of $H_2S$, as desired, but in practice such removal usually precedes purification from acidic impurities.

Removal of these acidic constituents is preferably accomplished by a liquid purification system employing a recirculated alkaline or neutral solution or suspension, as described hereinabove. To maintain the desired pH in the liquid, it has in the past been customary to make additions of an alkali, such as soda ash, from a source external to the gas plant. This entails the expense of supplying a storage space, transfer means, mixing tanks, etc., as well as the cost of the alkali itself, and furthermore it requires considerable supervision and operating labor.

These difficulties are overcome, the cost of alkali from an outside source is saved, and a substantial saving in the cost of purifying gas is effected, by utilizing the ammonia content of the gas itself to maintain the desired pH in the liquid. A further economy results from the fact that ammonia can be readily recovered from the salts contained in the spent purifying liquid by adding lime or the like and distilling, whereas when soda ash, etc., are used to maintain alkalinity, the salts must be recovered from the spent liquor and purified before use, or discarded.

Processes in which ammonia is used to maintain the desired alkalinity of Thylox solution have been described in copending applications Serial Nos. 342,316 and 342,317, filed Feb. 23, 1929, by D. L. Jacobson and H. A. Gollmar, respectively.

The ammonia content of the gas itself is so utilized, for example, by passing the gas through an absorber over which an ammoniacal solution of an arsenic compound is circulated to remove the $H_2S$ and other acidic impurities before passing the gas through the ammonia-removing system. By this means the cost of supplying alkali is saved, but a high vapor pressure with respect to ammonia is imparted to the solution, so that when it is actified the actifying air carries away free ammonia which is lost unless the air is passed through a special saturator or equivalent device. Furthermore, the consumption of alkali by conversion to fixed salts is much higher when this procedure is followed, as the gas at this point contains a relatively large amount of HCN which is at least partially removed in the cooler which precedes the $H_2S$ absorber in the normal sequence.

Our present invention provides an effective and readily controlled means of utilizing part of the ammonia content of the gas itself to provide the necessary alkalinity for the removal of acidic impurities from the gas by the Thylox process or other processes of liquid purification, such as the processes referred to hereinabove wherein compounds of iron, nickel, etc., are used, without the disadvantages which have attended previous attempts to accomplish this result.

In the process of our present invention, a portion of the substantially tar-free fuel gas is by-passed around the ammonia-removing system, the final cooler, and any other intervening apparatus, and introduced into the $H_2S$ absorber while still containing ammonia. This ammonia serves to maintain the desired pH in the absorbing solution and makes possible the purification of all the gas from $H_2S$ and the like without consumption of any alkali from outside sources.

As an alternative, it may be desirable in some instances, as in starting up a plant, to provide part of the alkalinity from another source. For example, the absorbing solution can be initially prepared by dissolving arsenious acid ($As_2O_3$) in a solution of sodium carbonate and/ammonia, or in ammoniacal condensate from the gas. Alkalinity in such suitable and readily available forms can also be used to supplement or partially replace the ammonia by-passed to the $H_2S$ absorber, if desired.

The ratio of the volume of gas passed through the apparatus in the usual order to the volume by-passed around the ammonia saturator or scrubber, etc., is adjusted, as by a valve or orifice in the by-pass line, so that the amount of ammonia reaching the $H_2S$ absorber is just sufficient to maintain the desired pH therein. As stated hereinabove, the preferred degree of alkalinity varies according to the type of purifying or absorbing liquid used, and the amount of ammonia allowed to enter the absorber is regulated accordingly. This regulation can be made automatic, if desired.

With the objects set forth above and other objects in view, we now describe with reference to the accompanying drawing a preferred method whereby our present invention can be practiced.

In the drawing,

The single figure is a view in elevation, with parts broken away, of apparatus suitable for the practice of our improved process of gas purification.

Fuel gas which is preferably substantially free from tar, but still contains ammonia and acidic impurities such as $H_2S$, flows through a pipe 1 to the intersection of pipes 2 and 3. A portion of the gas, which is usually the major portion, continues through pipe 2 into an ammonium sulphate saturator 4, wherein ammonia is removed from the gas by passage through a bath of sulphuric acid.

The gas substantially free from ammonia then leaves the saturator 4 and passes through a pipe 5, an acid separator 6 and a pipe 7 into a final cooler 10. In this cooler 10 the gas is cooled to substantially atmospheric temperature by means of cooling liquor introduced into the cooler through a pipe 11 and sprays 12, or other suitable distributing devices, which deliver the cooling liquor onto contact material, such as wooden hurdles 13, with which the interior of the cooler is packed. The liquor flows downwardly over the contact material in intimate contact with the countercurrently flowing gas and collects near the bottom of the cooler, from which it is withdrawn through a pipe 15 for recirculation or other disposal.

The cooled gas passes from the top of the cooler through a pipe 17 to its intersection with pipe 3. The gas in pipe 3, still containing ammonia, passes with the ammonia-free gas from pipe 17 through pipe 19 into an $H_2S$ absorber 20. In this absorber hydrogen sulphide and other acidic impurities are removed from the upwardly flowing gas by a fresh or actified absorbing solution or suspension, which enters the absorber through a pipe 22 and sprays 23. This liquid passes downwardly over the wooden hurdles 25 or other contact material with which the absorber is packed, absorbing acidic impurities from the countercurrently flowing gas and thereby becoming fouled.

The purified gas passes from the absorber through a pipe 27 ready for utilization. Fouled solution is withdrawn from the bottom of the absorber 20 through a pipe 29 by a pump 30 and delivered through a pipe 31 to the actification stage. This may consist of a flotation machine, a foraminous aerator, a pressure thionizer, or other suitable device. In the present instance a pressure thionizer 33 is used. This device forms no part of the present invention and is described in detail elsewhere.

The fouled purification liquid enters the thionizer near the bottom and passes upwardly therethrough concurrently with air introduced under pressure from a main 35 through a pipe 36, which is perforated or otherwise provided with means for distributing the air within the thionizer. The air with which the fouled solution is in contact during its upward passage through the thionizer serves to actify the solution and liberate sulphur in the form of froth which rises to the top of the liquid in a flotation chamber 38 forming the upper part of the thionizer. Froth passes through a weir in a plate 39 which divides the chamber 38 into two parts, and flows through a pipe 40 into a sulphur slurry or sludge container 41.

The actified solution passes from the bottom of the chamber 38 through a level regulator 43 into pipe 22, through which it returns to the absorber 20 to absorb acidic impurities from further quantities of gas. The ammonia contained in the gas by-passed around the saturator 4 and the final cooler 10 through pipe 3 suffices to maintain the desired pH in the recirculated solution, thus insuring efficient removal of impurities.

Although there are other operative methods of utilizing the ammonia content of the gas to maintain the alkalinity required for removal of $H_2S$ by these sulphur-recovering liquid purification processes, such as passing all the gas through the ammonia saturator (or scrubbers when indirect ammonia recovery is practiced) but not completely removing the ammonia thereby, or adding ammoniacal condensate from the gas to the sulphur recovering system, etc., we have found that the process of our present invention is preferable because of its simplicity and ease of control. Substantially no operating labor or supervision is required, and correct alkalinity in the absorbing solution can be maintained automatically by means of a regulator arranged to adjust the opening in the by-pass valve or orifice according to the additional alkalinity required in the absorber.

For example, if a thioarsenic compound were used as the purifying medium, only enough ammoniacal gas would be by-passed to the absorber to keep the solution slightly alkaline but substantially without ammonia vapor pressure, while other catalysts require higher akalinity and, consequently, a larger amount of gas is by-passed. Similarly the additions of ammonia to the absorber vary according to the amount of $H_2S$ in the gas and the amount of other constituents such as HCN which form fixed salts and consume alkalinity. All such variations are more readily compensated for by means of our present invention than by procedures previously known to the art and, in addition, considerable economies are effected, as stated hereinabove.

It will be obvious to those skilled in the art that various modifications can be made in the several steps of our process and in the several parts of our apparatus without departing from the spirit of our invention, and it is our intention to cover in the claims such modifications as are included within the scope thereof.

We claim as our invention:

1. The process of removing ammonia and hydrogen sulphide from gas which comprises: washing gas containing ammonia and hydrogen sulphide with an alkaline solution to remove the hydrogen sulphide therefrom, maintaining the alkalinity of the solution by absorption of the ammonia in the gas by the washing solution simultaneously with the removal thereby of the hydrogen sulphide from the gas, regulating the alkalinity of the solution by regulating the ammonia content of the total quantity of gas washed thereby, and effecting the latter regulation previously to the aforesaid washing of the gas by dividing the total quantity of gas, removing substantially all of the ammonia from one divided part while leaving the hydrogen sulphide therein, by-passing the other divided part relative to the ammonia removal step, combining the ammonia-freed part while still containing its hydrogen sulphide with the by-passed part while still containing substantially all of its ammonia and hydrogen sulphide, to form the total quantity of gas previously to the aforesaid hydrogen sulphide washing step, and varying the quantity of the divided part of the gas by-passed relative to the ammonia removal step to regulate the ammonia content of the total gas in the hydrogen sulphide washing step and thereby regulating the alkalinity of the hydrogen sulphide washing solution without addition thereto of ammonia removed in the ammonia removal step.

2. The process of removing ammonia and hydrogen sulphide from gas which comprises: washing gas containing ammonia and hydrogen sulphide with an alkaline solution to remove the hydrogen sulphide therefrom, maintaining the alkalinity of the solution by absorption of the ammonia in the gas by the washing solution simultaneously with the removal thereby of hydrogen sulphide from the gas, regulating the alkalinity of the solution by regulating the ammonia content of the total quantity of gas washed thereby, and effecting the latter regulation previously to the aforesaid washing of the gas by dividing the total quantity of the gas, passing one divided part through an acid bath and thereby removing substantially all of the ammonia from said part as ammonium compound crystals while leaving the hydrogen sulphide in the gas, by-passing the other divided part relative to the acid bath, combining the ammonia-freed part while still containing its hydrogen sulphide with the by-passed part while still containing substantially all of its ammonia and hydrogen sulphide to form the total quantity of gas previously to the aforesaid hydrogen sulphide washing step, and varying the quantity of the divided part of the gas by-passed relative to the acid bath to regulate the ammonia content of the total gas in the hydrogen sulphide washing step and thereby regulating the alkalinity of the hydrogen sulphide washing solution.

3. The process of removing ammonia and hydrogen sulphide from gas which comprises: washing gas containing ammonia and hydrogen sulphide with an alkaline solution which is recirculated over a stage in which it removes the hydrogen sulphide and ammonia from the gas and a stage in which it is activated, maintaining the alkalinity of the solution by absorption of the ammonia in the gas by the washing solution simultaneously with the removal thereby of the hydrogen sulphide from the gas, regulating the alkalinity of the solution by regulating the ammonia content of the total quantity of gas washed thereby, and effecting the latter regulation previously to the aforesaid washing of the gas by dividing the total quantity of gas, removing substantially all of the ammonia from one divided part while leaving the hydrogen sulphide therein, by-passing the other divided part relative to the ammonia removal step, combining the ammonia-freed part while still containing its hydrogen sulphide with the by-passed part while still containing substantially all of its ammonia and hydrogen sulphide, to form the total quantity of gas previously to the aforesaid hydrogen sulphide washing step, and varying the quantity of the divided part of the gas by-passed relative to the ammonia removal step to regulate the ammonia content of the total gas in the hydrogen sulphide washing step and thereby regulating the alkalinity of the hydrogen sulphide washing solution without addition thereto of ammonia removed in the ammonia removal step.

4. The process of removing ammonia and hydrogen sulphide from gas which comprises: washing gas containing ammonia and hydrogen sulphide with an alkaline solution which is recirculated over a stage in which it removes the hydrogen sulphide and ammonia from the gas and a stage in which it is activated, maintaining the alkalinity of the solution by absorption of the ammonia in the gas by the washing solution simultaneously with the removal thereby of hydrogen sulphide from the gas, regulating the alkalinity of the solution by regulating the ammonia content of the total quantity of gas washed thereby, and effecting the latter regulation previously to the aforesaid washing of the gas by dividing the total quantity of the gas, passing one divided part through an acid bath and thereby removing substantially all of the ammonia from said part as ammonium compound crystals while leaving the hydrogen sulphide in the gas, by-passing the other divided part relative to the acid bath, combining the ammonia-freed part while still containing its hydrogen sulphide with the by-passed part while still containing substantially all of its ammonia and hydrogen sulphide to form the total quantity of gas previously to the aforesaid hydrogen sulphide washing step, and varying the quantity of the divided part of the gas by-passed relative to the acid bath to regulate the ammonia content of the total gas in the hydrogen sulphide washing step and thereby regulating the alkalinity of the hydrogen sulphide washing solution.

GILBERT A. BRAGG.
DAVID L. JACOBSON.
PHILIP J. WILSON, Jr.